(12) United States Patent
Contarino, Jr.

(10) Patent No.: US 10,405,699 B2
(45) Date of Patent: *Sep. 10, 2019

(54) APPARATUS FOR CONVERTING COOKING GRILLS FOR COOKING PIZZA

(71) Applicant: Alfred F. Contarino, Jr., Boxford, MA (US)

(72) Inventor: Alfred F. Contarino, Jr., Boxford, MA (US)

(73) Assignee: AFC BUSINESS VENTURES, LLC, Boxford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,628

(22) Filed: Jul. 25, 2018

(65) Prior Publication Data
US 2018/0325316 A1   Nov. 15, 2018

Related U.S. Application Data

(63) Continuation of application No. 15/584,734, filed on May 2, 2017, now Pat. No. 10,051,997, which is a
(Continued)

(51) Int. Cl.
*A47J 37/07* (2006.01)
*A47J 37/06* (2006.01)

(52) U.S. Cl.
CPC ....... *A47J 37/0786* (2013.01); *A47J 37/0658* (2013.01); *A47J 37/07* (2013.01); *A47J 37/06* (2013.01); *A47J 2037/0795* (2013.01)

(58) Field of Classification Search
CPC .... A47J 37/07; A47J 37/0623; A47J 37/0658; A47J 37/0786
(Continued)

(56) References Cited

U.S. PATENT DOCUMENTS

| 833,529 A | 10/1906 | Jones |
| 1,751,219 A | 3/1930 | Seamon |

(Continued)

FOREIGN PATENT DOCUMENTS

| CN | 202386539 | 8/2012 |
| CN | 202537255 | 11/2012 |

(Continued)

OTHER PUBLICATIONS

"Pizza Hacker—San Fransico, CA", Feb. 23, 2010, YouTube, https://youtu.be/-x9IErbHJgg.
(Continued)

*Primary Examiner* — David J Laux
(74) *Attorney, Agent, or Firm* — Fisherbroyles, LLP

(57) ABSTRACT

The invention pertains to an accessory for adapting cooking grills, especially kettle and kamado style grills for better cooking of pizzas and other foods not typically thought of as appropriate for grilling. The accessory is an insert that is adapted to sit between the bottom and the top of the grill and is generally shaped with a horizontal cross-section substantially similar to the horizontal cross section at the junction of the bottom and the top of the grill with which it is adapted to work. The insert increases the height of the cooking chamber. The insert includes a side opening or window through which food may be inserted and removed from the expanded cooking chamber without the need to open or remove the top of the grill.

21 Claims, 7 Drawing Sheets

Related U.S. Application Data continuation of application No. 12/963,140, filed on Dec. 8, 2010, now Pat. No. 9,668,615.

(60) Provisional application No. 61/311,556, filed on Mar. 8, 2010.

(58) Field of Classification Search
USPC ........ 99/482, 352; 126/25 R, 9 R, 29, 275 R
See application file for complete search history.

(56) References Cited

U.S. PATENT DOCUMENTS

| | | |
|---|---|---|
| 2,015,295 A | 9/1935 | Steingruber |
| 2,127,146 A | 8/1938 | Smallen |
| 2,155,654 A | 4/1939 | Haley |
| 2,430,582 A | 11/1947 | Reich |
| 2,709,996 A | 6/1955 | Tescula |
| 2,842,116 A | 7/1958 | Hinderer |
| 2,898,846 A | 8/1959 | Del Francia |
| 2,940,381 A | 6/1960 | Cottongim |
| 3,152,242 A | 10/1964 | De Mott |
| 3,169,517 A | 2/1965 | Maier |
| 3,199,438 A | 8/1965 | Myler |
| 3,299,800 A | 1/1967 | Angelo |
| 3,380,444 A | 4/1968 | Stalker |
| 3,443,510 A | 5/1969 | Norton |
| 3,490,433 A | 1/1970 | Busenbarrick |
| 3,611,912 A | 10/1971 | Choc |
| 3,657,996 A | 4/1972 | Thompson |
| 3,783,855 A | 1/1974 | Newinger |
| 3,802,413 A | 4/1974 | Pepin |
| 3,938,494 A | 2/1976 | Clark |
| 3,947,657 A | 3/1976 | Ershler |
| 4,210,072 A | 7/1980 | Pedrini |
| 4,220,133 A | 9/1980 | Way, Jr. |
| 4,332,188 A | 6/1982 | Rhear |
| 4,362,093 A | 12/1982 | Griscom |
| 4,378,729 A | 4/1983 | Pierick |
| 4,384,513 A | 5/1983 | Pierick |
| 4,392,419 A | 7/1983 | Bonny |
| 4,437,396 A | 3/1984 | Plattner |
| 4,467,709 A | 8/1984 | Anstedt |
| 4,512,249 A | 4/1985 | Mentzel |
| 4,516,485 A | 5/1985 | Miller |
| 4,531,505 A | 7/1985 | Hait |
| 4,598,634 A | 7/1986 | VanHorn, II |
| 4,718,400 A | 1/1988 | Lotz |
| 4,721,037 A | 1/1988 | Blosnich |
| 4,777,927 A | 10/1988 | Stephen |
| 4,800,865 A | 1/1989 | Setzer |
| 4,823,684 A | 4/1989 | Traeger |
| 4,840,118 A | 6/1989 | Rinehart |
| 4,962,696 A | 10/1990 | Gillis |
| 5,088,470 A | 2/1992 | James, Jr. |
| 5,186,159 A | 2/1993 | Crow, Jr. |
| 5,213,027 A | 5/1993 | Tsotsos |
| 5,222,475 A | 6/1993 | Greener |
| 5,237,914 A | 8/1993 | Carstensen |
| 5,259,299 A | 11/1993 | Ferraro |
| D344,871 S | 3/1994 | Keller |
| 5,315,922 A | 5/1994 | Keller |
| 5,333,540 A | 8/1994 | Mazzocchi |
| 5,347,978 A | 9/1994 | Zuran |
| 5,355,868 A | 10/1994 | Haen |
| 5,365,833 A | 11/1994 | Chen |
| 5,368,009 A | 11/1994 | Jones |
| 5,404,795 A | 4/1995 | Coble |
| 5,490,452 A | 2/1996 | Schlosser |
| 5,553,601 A | 9/1996 | Parker |
| 5,586,488 A | 12/1996 | Liu |
| D381,868 S | 8/1997 | Schmitt |
| 5,678,531 A | 10/1997 | Byers |
| 5,768,977 A | 6/1998 | Parris |
| 5,850,780 A | 12/1998 | Mascia |
| 5,873,355 A | 2/1999 | Schlosser |
| 5,884,555 A | 3/1999 | Chang |
| 5,909,729 A | 6/1999 | Nowicke |
| 5,911,812 A | 6/1999 | Stanek |
| 5,960,782 A | 10/1999 | Clements |
| 6,000,389 A | 12/1999 | Alpert |
| 6,024,081 A | 2/2000 | Libertini, Jr. |
| 6,029,649 A | 2/2000 | Su |
| 6,039,039 A | 3/2000 | Pina, Jr. |
| 6,064,042 A | 5/2000 | Glucksman |
| 6,114,665 A | 9/2000 | Garcia |
| 6,153,857 A | 11/2000 | Gunnels |
| 6,158,330 A | 12/2000 | Andress |
| 6,187,359 B1 | 2/2001 | Zuccarini |
| 6,260,478 B1 | 7/2001 | Harneit |
| 6,308,616 B1 | 10/2001 | Johnson |
| D450,215 S | 11/2001 | Wood |
| 6,508,165 B2 | 1/2003 | Johnson |
| 6,546,845 B1 | 4/2003 | Lanzilli |
| 6,640,695 B2 | 11/2003 | Stark |
| 6,705,307 B2 | 3/2004 | Alden |
| D494,004 S | 8/2004 | Chapman |
| 6,892,722 B1 | 5/2005 | Francies, III |
| 6,931,985 B1 | 8/2005 | Attie |
| 7,163,011 B2 | 1/2007 | Pestrue |
| D554,944 S | 11/2007 | Wood |
| D560,415 S | 1/2008 | Wood |
| 7,686,010 B2 | 3/2010 | Gustavsen |
| 7,905,225 B2 | 3/2011 | Contarino |
| D645,295 S | 9/2011 | Klesath |
| 8,261,732 B2 | 9/2012 | Contarino, Jr. |
| 8,267,078 B2 | 9/2012 | Kuntz |
| 8,578,927 B2 | 11/2013 | Gustavsen |
| 9,198,538 B2 | 12/2015 | Safar |
| 9,492,031 B2 | 11/2016 | Diaz |
| 9,668,615 B2 * | 6/2017 | Contarino, Jr. ......... A47J 37/07 |
| 10,051,997 B2 * | 8/2018 | Contarino, Jr. ......... A47J 37/07 |
| 2002/0017290 A1 | 2/2002 | Hines |
| 2002/0020303 A1 | 2/2002 | Johnson |
| 2003/0145740 A1 | 8/2003 | Stark |
| 2003/0213484 A1 | 11/2003 | Alden |
| 2004/0112226 A1 | 6/2004 | Johnston |
| 2005/0039612 A1 | 2/2005 | Denny |
| 2006/0000365 A1 | 1/2006 | Attie |
| 2006/0102015 A1 | 5/2006 | Baker |
| 2006/0102167 A1 | 5/2006 | Driscoll |
| 2006/0112948 A1 | 6/2006 | Ducate |
| 2006/0191528 A1 | 8/2006 | Spangrud |
| 2007/0163568 A1 | 7/2007 | Murray |
| 2007/0175467 A1 | 8/2007 | Liu |
| 2007/0221191 A1 | 9/2007 | O'Brien |
| 2007/0277800 A1 | 12/2007 | Chiang |
| 2009/0064872 A1 | 3/2009 | Zisserson |
| 2009/0078246 A1 | 3/2009 | Leavens |
| 2009/0090348 A1 | 4/2009 | Contarino |
| 2009/0101024 A1 | 4/2009 | Button |
| 2010/0124596 A1 | 5/2010 | Nelson |
| 2010/0132689 A1 | 6/2010 | Contarino |
| 2010/0147281 A1 | 6/2010 | Gustavsen |
| 2010/0147285 A1 | 6/2010 | Seong |
| 2011/0214662 A1 | 9/2011 | Contarino |
| 2012/0024171 A1 | 2/2012 | Estes |
| 2014/0251160 A1 | 9/2014 | Contarino |
| 2015/0027432 A1 | 1/2015 | Contarino |
| 2015/0164278 A1 | 6/2015 | Kohler |

FOREIGN PATENT DOCUMENTS

| | | |
|---|---|---|
| DE | 3926182 | 2/1991 |
| DE | 9311876 | 11/1993 |
| DE | 202005003982 | 6/2005 |
| FR | 2635258 | 2/1990 |
| GB | 2143119 | 2/1985 |
| GB | 2489421 | 10/2012 |
| JP | 2006102488 | 4/2006 |

(56) References Cited

FOREIGN PATENT DOCUMENTS

| WO | 2011027096 | 3/2011 |
|----|------------|--------|
| WO | 2012159131 | 11/2012 |

OTHER PUBLICATIONS

Ah Nom Nom: Pizza Hacker—Best Pizza Food Cart—San Francisco, Sep. 22, 2009, YouTube, <https://www.youtube.com/watch?v=RLC-SIGpZkE >.
Chinese Office Action dated Apr. 3, 2016 for Chinese Application No. 201410200874.1, including English translation.
Chinese Office Action dated Jul. 27, 2017 for Chinese Application No. 201410200874.1, including partial English language translation.
Chinese Office Action dated Nov. 9, 2016, for Chinese Application No. 201410200874.1, including English translation.
Malloy, Ryan, "Plasticity," 2012, Vimeo video retrieved online from <https://vimeo.com/couchmode/user1057436/videos/sort:date/12827359> on Sep. 6, 2016.
PizzaHacker's BackYard, LLC, "The Pizza Hacker.com," 2013, retrieved online from <http://thepizzahacker.com/> retrieved on Sep. 6, 2016.
Webpage for "Amazon.com : Weber 7403 Char-Basket Charcoal Briquet Holders : Grill Parts: Patio, Lawn & Garden" from Amazon.com, http://www.amazon.com/Weber-7403-Char-Basket-Charcoal-Briquet/dp/B000WEMGM4/ref=sr_1_1ie=UTF8&qid=1402322800&sr=81&keywords=weber+7403+charbasket+charcoal+briquet+holders, retrieved on Nov. 2, 2012.
Webpage for "Grilling Accessory Grill Accessories Pizza Stone Pizza Ovens" from Red Sky Grilling Products, http://redskygrilling.com/, retrieved on Oct. 23, 2012.

* cited by examiner

APPARATUS FOR CONVERTING COOKING GRILLS FOR COOKING PIZZA

CROSS-REFERENCE TO RELATED APPLICATIONS

This application is a continuation of U.S. application Ser. No. 15/584,734, filed May 2, 2017, which is a U.S. application Ser. No. 12/963,140, filed Dec. 8, 2010, now U.S. Pat. No. 9,668,615, issued Jun. 6, 2017, which claims priority to U.S. Provisional Application No. 61/311,556, filed Mar. 8, 2010, the entire disclosures of which are hereby incorporated fully herein by reference.

FIELD OF TECHNOLOGY

The invention pertains to cooking apparatus. More particularly, the invention pertains to an apparatus for adapting cooking grills, especially kettle or kamado style grills, to cook pizzas and other foods in an improved manner.

BACKGROUND

People often wish to cook foods, such as pizza, on their outdoor cooking grills that are not necessarily traditionally considered grill foods. For instance, with respect to pizza, the desired cooking temperature for many pizza recipes is very high, on the order of about 600 to 750° Fahrenheit. It also is important that the temperature within the cooking chamber be particularly consistent, both spatially (the temperature is substantially the same everywhere within the cooking chamber) and temporally (the temperature does not fluctuate significantly with time). First, the temperature should be spatially consistent so all of the ingredients cook properly. A common problem with cooking pizza, particularly in grills, is that the crust cooks too fast relative to the ingredients on top of the crust such that the crust becomes too dry or even burns before all of the ingredients on top of the pizza are fully cooked or properly melted. Thus, temperature uniformity as a function of height above the heating element (e.g., charcoal, wood, or flame burners) is desired. Furthermore, if the temperature is not uniform in the horizontal direction, some sections of the crust may burn before other sections of the crust are fully baked.

Even further, maintaining a consistent temperature over time also is often important to cooking pizza (as well as many other foods). First, a consistent, proper temperature will, of course, cause the food to cook faster than a fluctuating temperature and temperature fluctuations can lead to the food not cooking properly all the way through to the center.

Often, it is particularly difficult to maintain consistent temperature in cooking grills for several reasons. First, in a conventional grill, the top of the grill must be removed to place food in the grill, remove food from the grill, and observe the cooking food. Since heated air rises relative to surrounding cooler air, each time the grill cover is removed, essentially all of the heated air in the cooking chamber rises and escapes, requiring the chamber to heat up again after the cover is replaced. Not only could this cause it to take longer to cook the food, but it could lead to uneven cooking since the air in the space beneath the food is likely to remain much hotter or at least heat up much more quickly than the air in the space above the pizza after each opening of the cover. This is particularly problematic with respect to cooking pizzas because the pizza dough and/or the solid surface on which the pizza must sit (such as a pizza stone) forms a large uninterrupted barrier between the air space below the pizza and the air space above the pizza. Also, since pizza recipes often require extremely high temperatures, temperature differentials can be significant.

Kettle grills and kamado style grills are two common grill types. An exemplary kettle style grill 10 is shown in FIG. 1. An exemplary kamado style grill 20 is shown in FIG. 2. The cooking chambers 11, 21, respectively, of both of these styles of grill, respectively, (i.e., the enclosed portion containing the heating fuel and the cooking surface) are generally ovoid in shape with a circular or oval horizontal cross-section. They comprise a bottom or base portion 12, 22, respectively, and a top or cover portion 13, 23, respectively. They usually are heated by charcoal or wood placed in the bottom of the cooking chamber, although kettle and kamado grills heated by electricity or liquid fuel, such as propane, are known. Kettle style grills are often made of metal, such as steel. Kamado style grills usually are made of ceramic or other earthen materials that retain heat well. Most kettle style grills have a removable top 13, whereas kamado style grills usually have a hinged top 23 because the ceramic top is very heavy and would be difficult to handle if it were not attached. Since kettle and kamado style grills usually are round (as are pizzas) and usually are fueled by charcoal or wood so that they more easily achieve the higher cooking temperatures than electric or propane grills, they are often used for cooking pizzas.

SUMMARY

The invention pertains to an accessory for adapting cooking grills, especially kettle and kamado style grills, for improved cooking of pizzas and other foods. The accessory is an insert that is adapted to sit between the bottom and the top of the grill and is generally shaped with a horizontal cross-section substantially similar to the horizontal cross section at the junction of the bottom and the top of the grill with which it is adapted to work. The insert increases the height of the cooking chamber. The insert includes a side opening or window through which food may be inserted and removed from the expanded cooking chamber without the need to open or remove the top of the grill.

DETAILED DESCRIPTION OF EMBODIMENTS

Figure 1:
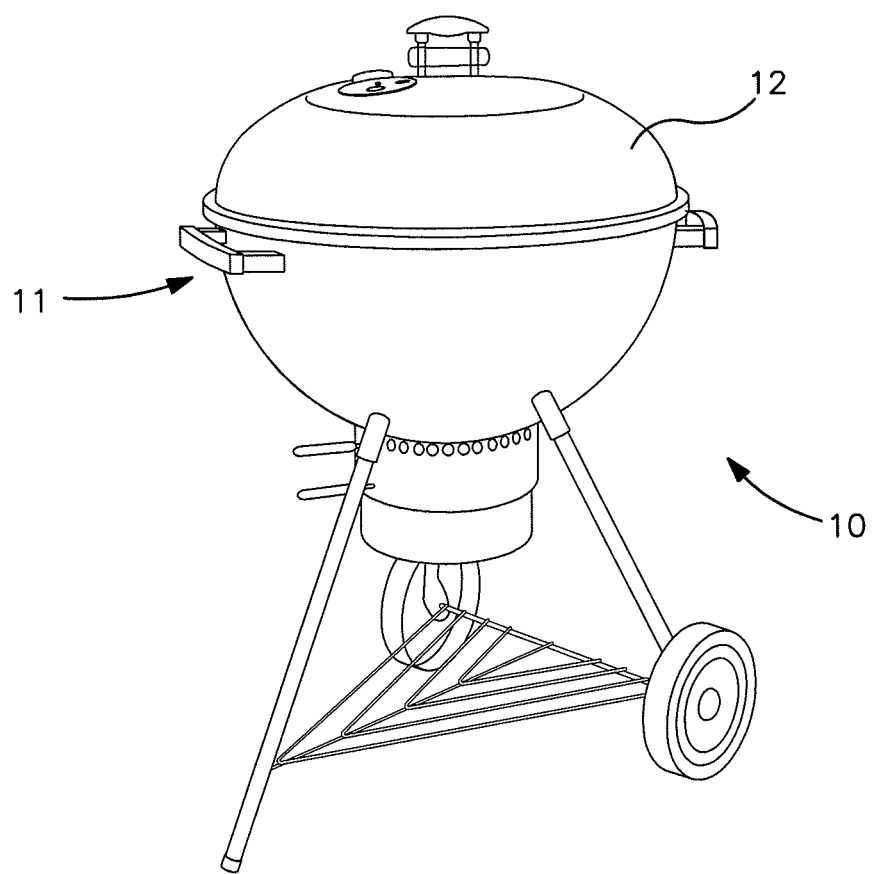
FIG. 1 shows a conventional kettle style grill.
Figure 2:
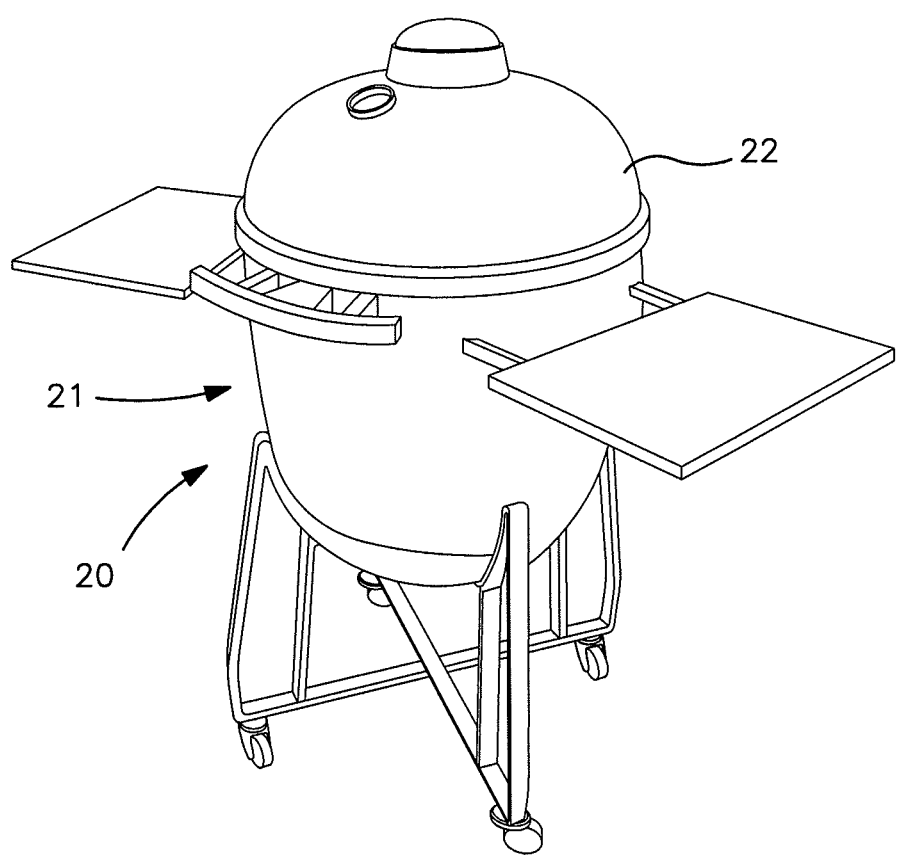
FIG. 2 shows a conventional kamado style grill.
Figure 3:
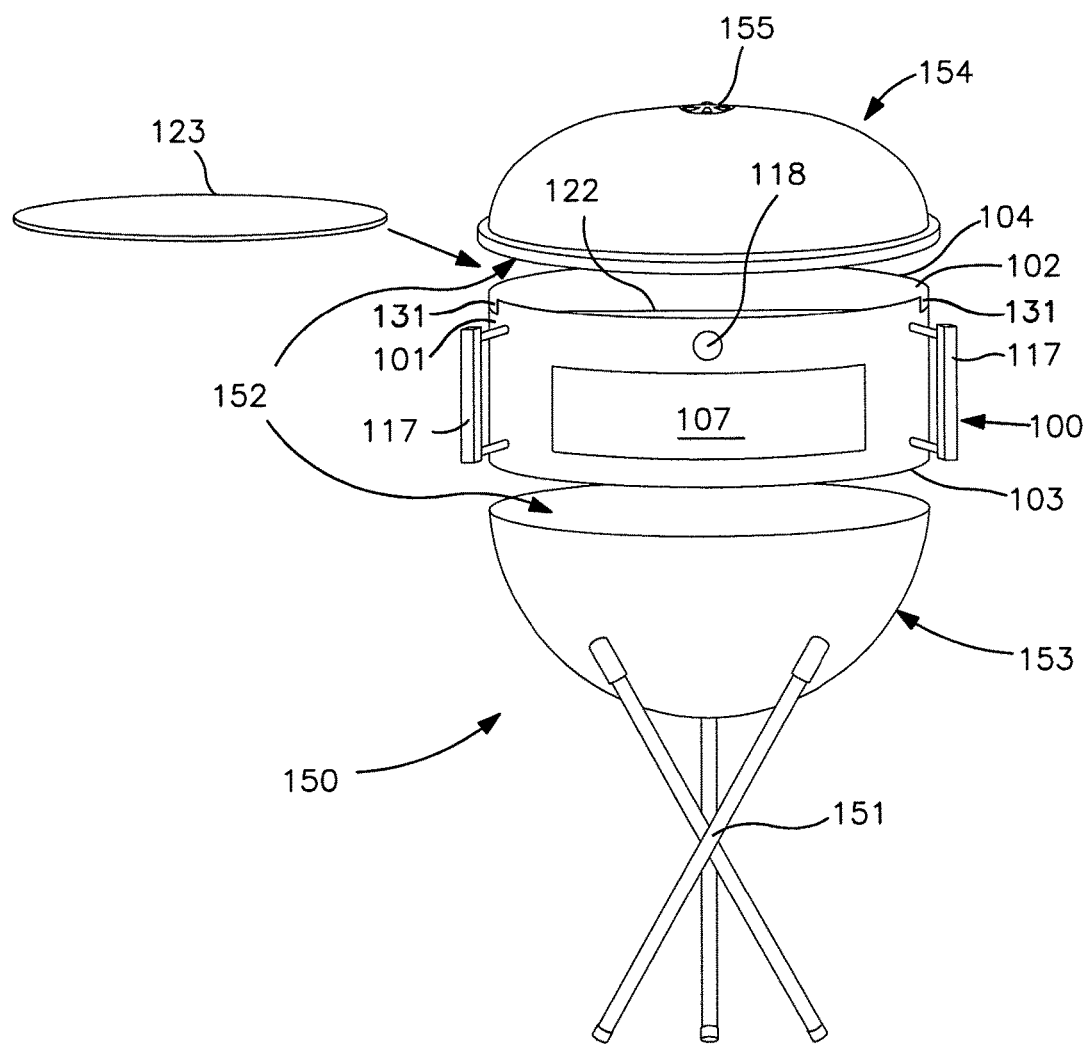
FIG. 3 is an exploded view of a kettle style grill with an accessory in accordance with the principles of the present invention.
Figure 4A:
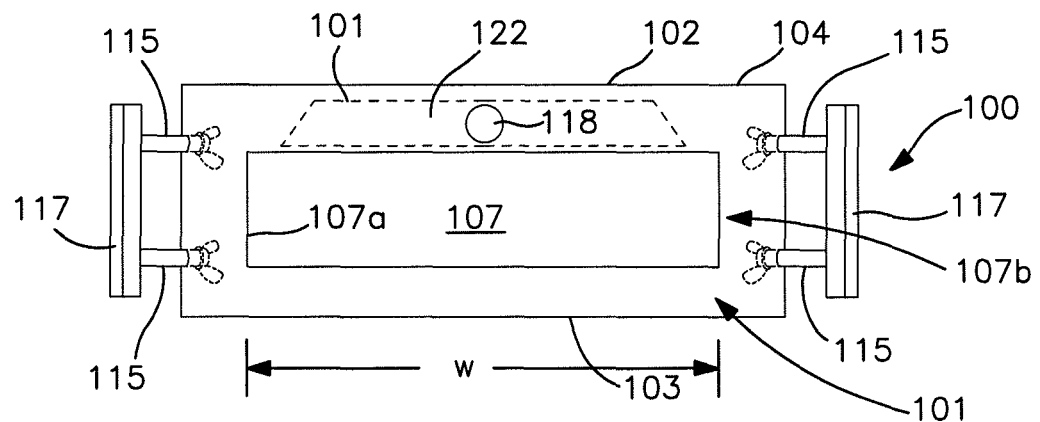
FIG. 4A is a front side view of an exemplary insert in accordance with the principles of the present invention.
Figure 4B:
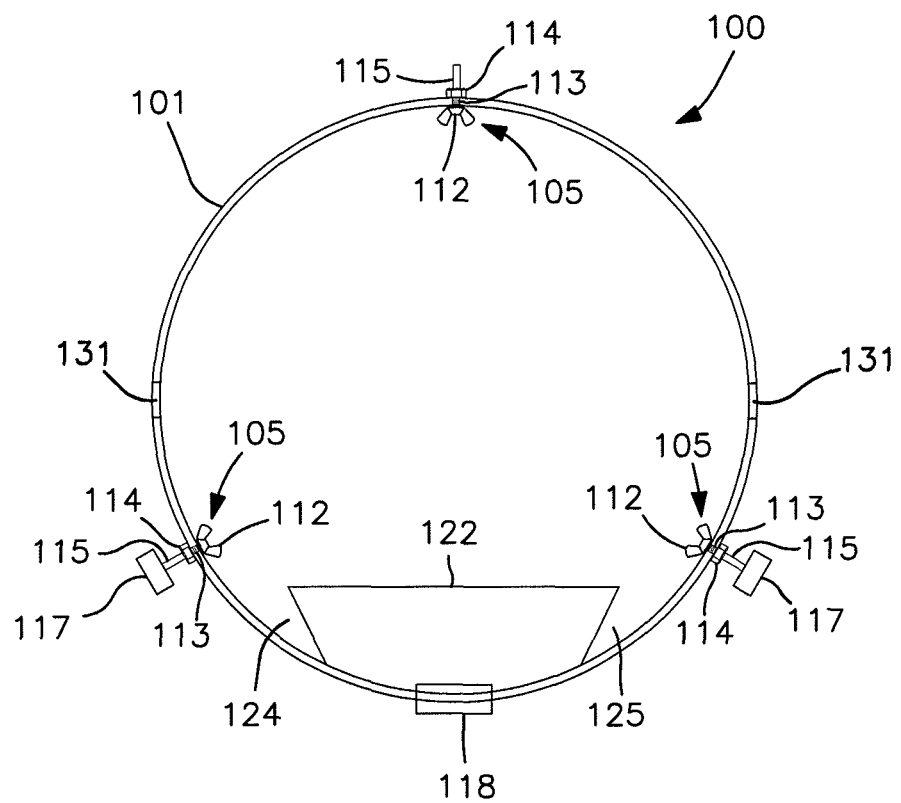
FIG. 4B is a bottom view of an exemplary insert in accordance with the principles of the present invention.
Figure 5:
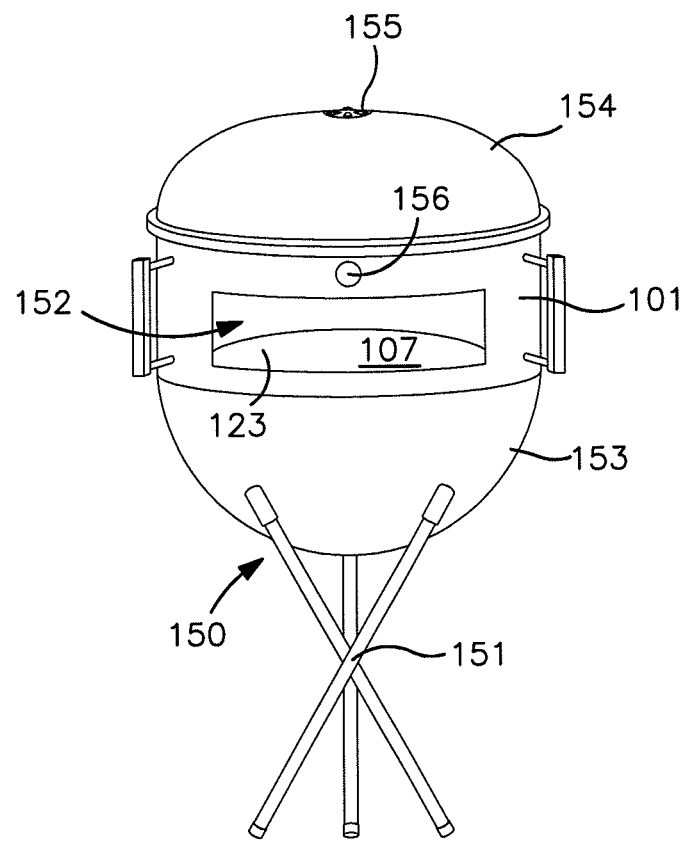
FIG. 5 is a view of a kettle style grill with an accessory in accordance with the principles of the present invention.

FIG. 3 is an exploded view of an embodiment of an apparatus 100 in accordance with the principles of the present invention in use in connection with a kettle style grill 150. FIGS. 4A and 4B are side and top views respectively of the apparatus 100 of FIG. 3. FIG. 5 is similar to FIG. 3 except showing the apparatus 100 and grill 150 in an assembled condition. The kettle style grill 150 comprises a stand 151 and a cooking chamber 152 formed by a bottom portion 153 and a top portion 154 adapted to mate with each other to from a substantially enclosed cooking chamber and retain heat therein. The top 154 includes an adjustable vent 155 for controlling the rate at which air travels through the cooking chamber, which flow rate can be used to control the temperature in the cooking chamber. A similar vent (not shown) may be provided in the bottom portion 153. Generally, the greater the air flow rate, the quicker the fuel will burn and therefore the hotter the cooking temperature inside the cooking chamber.

The embodiment of the invention illustrated in FIG. 3 comprises an apparatus in the form of an insert 101 that converts the kettle style grill 150 into a pizza oven having more consistent temperature variability, thereby yielding better cooking results. The insert 101 preferably is sized to have the same horizontal cross-sectional shape and size as the grill 150 with which it will be used so as not to reduce the cross section of the cooking chamber. Thus, in this embodiment, the insert 101 is a hollow cylinder having a diameter substantially equal to the diameter of the grill 150 at the juncture where the top 154 and bottom 153 are intended to mate. The insert 101 essentially is a hollow cylinder that is substantially open at its top and bottom ends 102 and 103, respectively, and that is sandwiched between the grill top 154 and grill bottom 153.

The insert 101 can be made of any material that is sufficiently heat resistant to withstand the maximum temperatures conventionally generated in a pizza oven or grill (it should probably be able to withstand at least 750 degrees Fahrenheit) and sufficiently strong to support the weight of the grill top 153. Steel or another metal or ceramic material is preferred.

The insert may be provided with a built-in thermometer 118. The insert 101 has a side window 107 that allows a user to insert and remove a pizza from the apparatus 100 without having to remove the grill top 154, which would allow essentially all of the heat to escape. A cover or door (not shown) may be provided in the window 107. A cover will help prevent heat from escaping through the window and will facilitate use of the grill and insert combination as a smoker. However, in the illustrated embodiment, no cover is provided. Since heated air tends to rise, the vertically oriented side window 107 will not let excessive amounts of heat escape from the cooking chamber 152 through window 107, even in the absence of a cover. Also, the absence of a cover permits constant visual access to the food cooking inside the cooking chamber without the need to remove the food from the cooking chamber. Also, without a cover, the user need not ever touch the hot insert 101 during cooking.

However, optionally, a heat deflector 122 (best seen in FIG. 4B) may be provided just above the window 107. The heat deflector 122 may be a sheet of metal or other heat resistant material that extends inwardly from the inside edge of the insert 101 approximately one quarter to one third into the cooking chamber. It may be angled downwardly from the edge toward the center of the cooking chamber. In using the apparatus of the present invention, it is recommended to arrange the coals toward the back of the cooking chamber, i.e., away from the window 107. Thus, much of the heated air rises up in the back of the cooking chamber over the pizza and rotates back down by the front of the cooking chamber, i.e., near the window. The heat deflector 122 will redirect the downwardly moving heated air away from the window back toward the center of the cooking chamber above the pizza, thereby even further minimizing the amount of heat escaping through the window 107 and causing the cooking chamber to be more uniform in temperature. The heat deflector may be shaped so that there are gaps 124, 125 near its side edges located within the lateral extent, w, of the window 107 so that some heat does flow past the deflector 122 and escapes through the window 107 around the edges of the heat deflector 122. In this manner, most of the recirculating heated air that does escape through the window 107 does so near the lateral edges 107a, 107b of the window 107 far from the thermometer 118, thus preventing the face of thermometer 118 from becoming blackened by soot. The heat deflector 122 may be removable or permanent.

The window 107 should be large enough both in the horizontal direction and in the vertical direction to allow easy insertion and removal of a pizza using a pizza peel or other implement. On the other hand, it should be small enough so as not to allow a significant amount of heat to escape through the opening. In one embodiment adapted for use with a 22 inch diameter kettle grill, the width of the window is about 30-40% of the circumference of the insert (which is about 20.5 to about 27.5 inches wide as measured on the curved cylindrical surface or about 17.8 to about 21 inches linearly across from left edge to right edge) and is about 3-6 inches tall. These dimensions allow a pizza relatively close to the full 22 inch diameter of the grill to be inserted and removed through the window with plenty of vertical clearance, but still retain most of the heat in the cooking chamber without it escaping through the window.

In one embodiment, a pair of opposing slots 131 may be provided at the top of the insert 101 located 180° from each other around the cylindrical insert 101 for receiving and supporting a spit (not shown) therebetween to allow rotisserie-style cooking (with or without the top 154 of the grill in place).

In one embodiment, the insert 101 can be sized to fit within the bottom portion 153 of the grill and sit directly on the original-equipment cooking surface, e.g., a grill grating (not shown). Alternately, the original equipment cooking surface may be removed and the insert may be configured to sit on the original-equipment supports (also not shown) for the original-equipment cooking surface.

In the illustrated embodiment, as best seen in FIG. 4B, three supports 105 are provided near the bottom end of the insert 101 for supporting a removable pizza stone, grill, griddle, or other cooking surface 123 in the insert 101.

In the illustrated embodiment, the supports 105 comprise pins in the form of threaded bolts 115 passing from without the insert 101 to within the insert 101 through holes 113 in the side of the insert 101 with stop nuts 114 screwed into the bolts from outside of the insert 101 and wing nuts 112 screwed onto the bolts 115 from the inside of the insert 101 such that the material of the insert 101 is trapped tightly between the stop nut 114 and the wing nut 112. The cooking surface 123 can rest on the distal ends of the bolts 115 and/or the wing nuts 112. Preferably the wing nuts 112 are screwed in so that the wings of each of the wing nuts extend horizontally so as to collectively provide a stable, horizontal platform for the cooking surface 123 to rest upon. In other embodiments, support for a cooking surface may be provided in the form of bars running across insert 101 near the bottom end 103 that not only offer support for a pizza stone or other cooking surface, but also provide rigidity to the insert.

Similar supports 105, such as three identical bolts 115, holes 113, stop nuts 114, and wing nuts 112, may be provided near the top of the insert 101 to support the grill cover 154 on the insert 101. Alternately, however, the top supports may be omitted and the top lip 104 of the insert 101 may be designed to support the grill cover 154 directly without the need for any additional support structure.

In this embodiment, two handles 117 are provided on the outside of the insert 101, allowing it to be lifted without touching the insert directly, which will be very hot during and for a period after cooking. The handles 117 may be formed of any material with a low coefficient of heat so as not to heat up as much as the insert 101, which likely will be made of steel or another metal or ceramic material. The handles 117, for instance may be formed of wood.

In this embodiment, the handles 117 are oriented vertically on the side of the insert 101. The handles 117 may be made long enough to extend most of the way from the bottom end 103 of the insert to the top end 102. In this manner, two of the three top bolts 115 for supporting the cover 154 may also serve double duty as the bolts for attaching the top ends of the two handles 117 to the insert 101 and two of the bottom three bolts 115 that form part of the supports 105 for the cooking surface 123 may also serve as the bolts for attaching the bottom ends of the handles 117 to the insert 101. Specifically, each handle 117 is attached to the insert 101 via one of the top bolts 115 and one of the bottom bolts 115 that run through holes 113 in the side of the insert 101 and are attached to the insert by the stop nuts 114 and wing nuts 112 as previously described.

In other embodiments, the handles may extend horizontally and extend between two bottom bolts 115.

Figure 6:
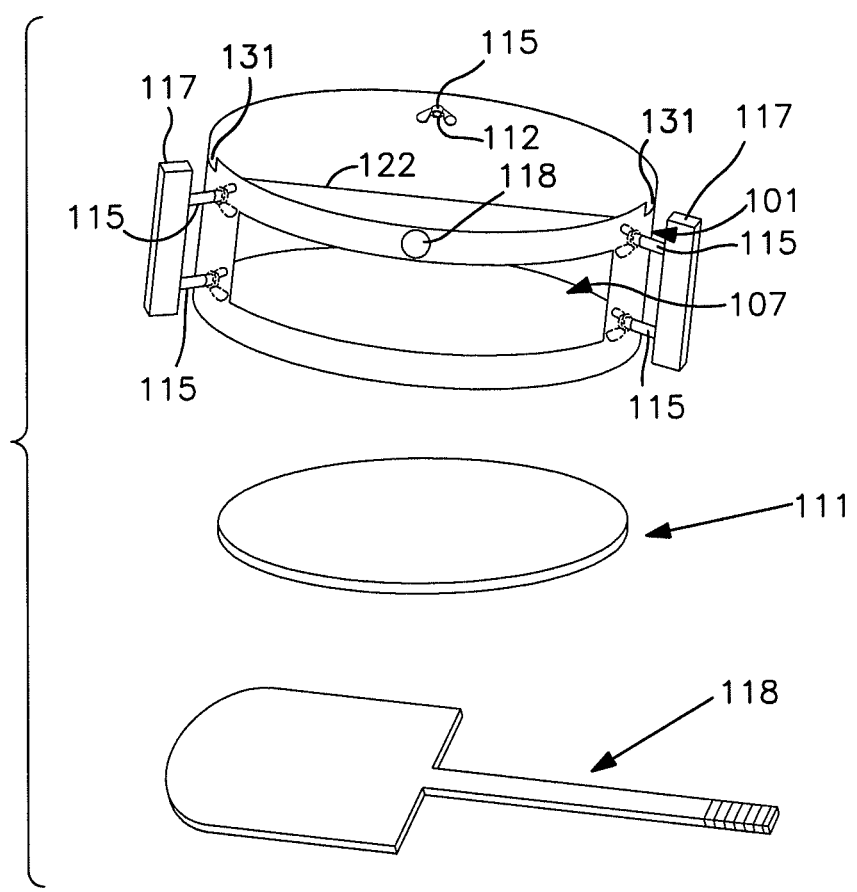
FIG. 6 is a diagram illustrating the components of an exemplary kit incorporating the principles of the present invention.

In one embodiment, the original-equipment grill surface that typically is provided with the purchase of the grill may be placed on the supports 105. However, in another embodiment, such as illustrated in FIG. 6, the apparatus 100 may be sold along with a cooking surface, such as a pizza stone 111. In fact, the insert 101 may be sold in a kit along with a cooking surface, such as a pizza stone 111, and a pizza peel 118. For cooking foods other than pizzas and the like, the apparatus may be sold with a skillet (not shown) or other or additional cooking apparatus.

Figure 7A:
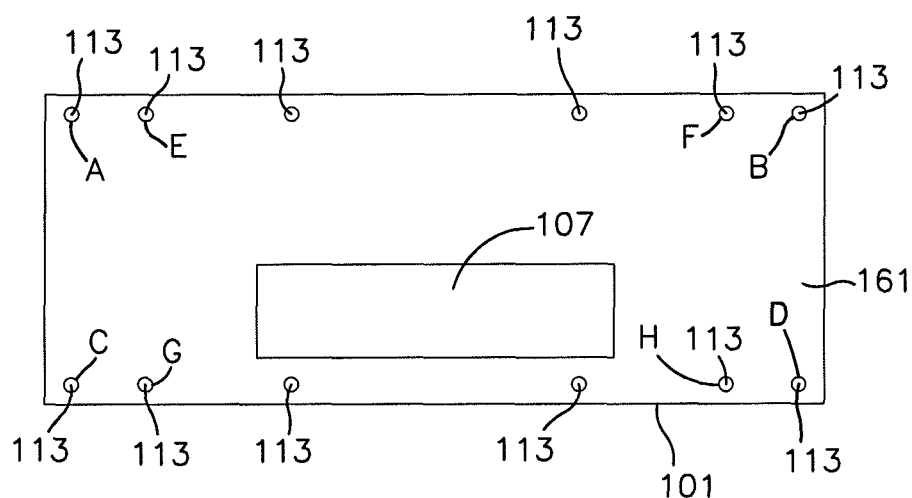
FIG. 7A is a plan view of the insert of the present invention shown in a pre-assembled, flattened state.
Figure 7B:
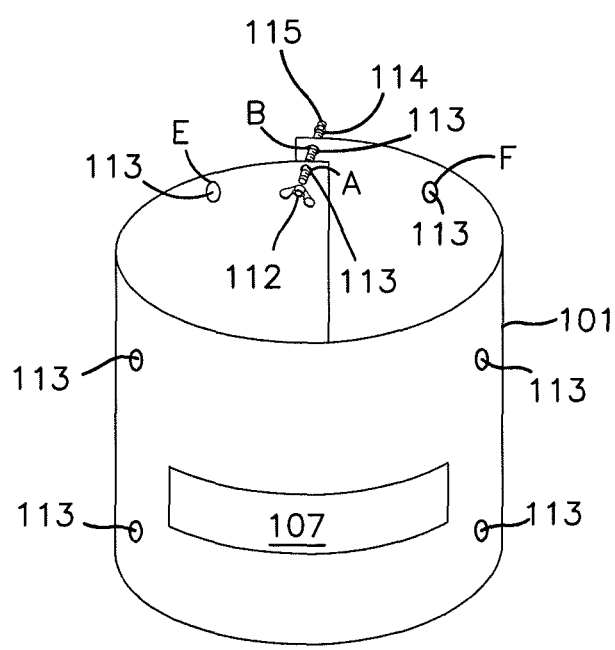
FIG. 7B is a perspective view of the insert of FIG. 7A shown in a partially assembled state.

Another advantage of the particular illustrated embodiment utilizing bolts 115 and wing nuts 112 as supports is that the apparatus 100 is very simple to manufacture and can be shipped in a very small, unassembled state and assembled very easily. For instance, it may be shipped flat or rolled into a small cylinder. Specifically, with reference to FIGS. 7A and 7B, the insert 101 may be manufactured as a simple rectangular sheet of metal 161 with the window 107 punched or cut therein and a plurality of holes 113 for receiving the bolts 115 as previously described. However, one of the top holes 113 for receiving one of the top bolts 115 and one of the bottom holes 113 for receiving one of the bottom bolts 115, respectively, may be formed from two overlapping openings in the insert. More specifically, each of these two bolt holes 113 is formed by two openings disposed near opposite longitudinal edges of the flattened insert 101. Thus, the insert may be shipped in a flat state as illustrated in FIG. 7A. Then, when it is ready for assembly, the assembler flexes or folds the sheet of metal 161 into a cylinder as shown in FIG. 7B so that the two top openings near the opposite edges of the sheet 161 (labeled A and B in FIGS. 7A and 7B) align with each other and the two bottom openings near the opposite edges of the insert (labeled C and D in FIGS. 7A and 7B) align with each other. The assembler then inserts one bolt through each pair of aligned openings A/B and C/D) and screws a wing nut onto each bolt to hold the sheet of metal 161 in the cylindrical form. Thus, some of the bolt/nut/hole combinations can serve as many as three different functions, namely, (1) holding the insert 101 in its cylindrical shape, (2) as standoffs for supporting the insert 101 on the grill 150 (the bottom such bolts) or the grill top 154 on the insert 101 (the top such bolts) and (3) as a handle mount as previously discussed.

Extra holes 113, such as holes E, F, G, and H, may be provided so that a single insert can be adapted for used with grills of different diameters. For instance, aligning hole A with hole B and hole C with hole D as described above may cause the insert to form a cylinder 26 inches in diameter (a common grill size). However, additional holes, such as holes E, F, G, and H, may be provided to allow the insert to be rolled into a variety of different diameters. For instance, by aligning hole A with hole F and hole C with hole H, the insert may form a cylinder of 22 inches diameter (another common grill diameter); by aligning hole E with hole B and hole G with hole D, the insert may form a cylinder of yet another diameter; and by aligning hole E with hole F and hole G with hole H, the insert may form a cylinder of yet one more diameter.

The increased height of the cooking chamber and the relatively higher location of the cooking surface within the chamber provide more vertical space beneath the cooking surface, which allows for additional fuel, e.g., charcoals or wood, to be placed in the cooking chamber beneath the food. This is useful because it is often desirable to add wood to the typical charcoal fire to impart additional flavor to the pizza and/or to simply increase the amount of fuel in the cooking chamber because of the unusually high temperatures typically employed for cooking pizza.

For a conventional kettle type grill, in which the top is completely separable from the bottom, no special provisions would be necessary except that the insert should be sized to fit conveniently in the grill bottom with the supports disposed above and, preferably not in contact with the coals or other heat source. The insert 100 may, for instance, be designed to sit directly on top of a standard grill surface in the grill. In a kamado style or other type of grill in which the top normally is hingedly connected to the bottom, the hinge would need to be disconnected. The insert 100 may be provided with a hinge mount at its top edge to permit the grill top 4 to be hingedly connected to the insert 101. However, when the insert is being used, there normally should be no need to lift the grill top 4 off of the insert 101. Accordingly, the hinge mount may be omitted. Further, even if desired to lift the top, this may be done manually without a hinge if the top is not too heavy, even if the top was initially hinged to the bottom in the original grill.

Furthermore, in a kamado style grill, the top may be quite heavy and it may be inadvisable to hingedly connect the grill top to the insert anyway, since opening a heavy grill top hingedly could cause the entire insert 101 to topple over from the uncentered weight of the grill top when in an open position. Of course, alternately, the insert 101 could be provided with attachment means for fixedly attaching the insert to the grill bottom so as to prevent toppling in such a case. Also, in embodiments adapted for use with Kamado style grills, which usually are made of ceramic, the insert also is preferably made of ceramic and, therefore, may be heavy enough to support the top without being attached to the grill bottom.

The insert may be implemented any number of ways, including, but not limited to (1) as an aftermarket add-on, (2) as a removable feature of the original grill, or (3) as a permanent part of the grill.

While the exemplary embodiment described in detail herein is configured to work with circular grills, such as kamado and kettle style grills, this is merely exemplary. The grill and insert may be other shapes, such as rectangular and square.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. An accessory for a cooking grill, the cooking grill including matable bottom and top portions that collectively define a substantially enclosed cooking chamber between the top and bottom portions for cooking food, the accessory comprising:
    an insert having a bottom edge for supporting the insert on the bottom portion of the cooking grill, and a top edge for supporting the top portion of the cooking grill on the insert to increase a height of the cooking chamber when positioned between the top and bottom portions of the grill, the insert defining an open window defined between the top and bottom edges to provide access to a portion of the cooking chamber above a cooking surface; and
    a support for supporting the cooking surface on the insert.

2. The accessory of claim 1, further comprising a thermometer disposed on the insert.

3. The accessory of claim 1, wherein the window has a height of about 3 to about 6 inches, and a width in the horizontal dimension of about 30% to 40% of a circumference of the insert as measured along a curved surface of the sidewall.

4. The accessory of claim 1, further comprising the cooking surface positioned inside the insert, on the first plurality of supports.

5. The accessory of claim 1, wherein the first plurality of supports comprises a first plurality of bolts extending through holes in the insert from without the insert to within the insert.

6. The accessory of claim 5, further comprising handles disposed on an outside of the insert, wherein at least a few of the first plurality of bolts further comprise mounts for the handles.

7. The accessory of claim 5, further comprising a second plurality of supports for supporting the top portion of the grill on top of the insert, wherein the second plurality of supports comprises bolts extending through holes in the insert from without the insert to within the insert.

8. The accessory of claim 1, wherein the insert is formed of a flexible sheet of metal having first and second opposing lateral edges and at least first and second holes disposed near the first lateral edge and at least third and fourth holes disposed near the second lateral edge and wherein the sheet of metal is flexed into a condition such that the first and third holes overlap each other and the second and fourth holes overlap each other and wherein the piece of sheet metal is maintained in the flexed condition by a first pin passing through the first and third holes and a second pin passing through the second and fourth holes.

9. The accessory of claim 8, wherein the at least first and second holes comprise a plurality of pairs of holes, each pair of holes being laterally aligned on the sheet of metal, whereby the sheet of metal can be flexed into a cylinder of any of a plurality of different diameters by causing the third and fourth holes to overlap with different ones of the pairs of holes and inserting the first and second pins through the aligned holes, each of the plurality of different diameters corresponding to a respective one of a plurality of different grill sizes.

10. A combination comprising the accessory of claim 1, a pizza stone, and a peel.

11. An accessory for a cooking grill, the cooking grill including matable bottom and top portions that collectively define a substantially enclosed cooking chamber between the top and bottom portions for cooking food on a cooking grill grate, the accessory comprising:
    an insert having open ends at top and bottom edges, the insert being adapted to be disposed between the top and bottom portions of the cooking grill to increase a height of the cooking chamber, and defining an open window positioned to provide access to a portion of the cooking chamber above a cooking surface, the accessory not being provided with a cover or door for covering the window;
    wherein the insert corresponds in size and shape to a horizontal cross section of the cooking grill at a juncture where the top portion and the bottom portion of the cooking grill mate so as to mate with the bottom and top portions of the cooking grill to maintain the cooking chamber as a substantially enclosed space, except for the window, when disposed between the top and bottom portions of the cooking grill.

12. An accessory for a cooking grill, the cooking grill including matable bottom and top portions that collectively define a substantially enclosed cooking chamber between the top and bottom portions for cooking food, the accessory comprising:
    an insert having a sidewall having top and bottom edges extending around the sidewall, the insert being adapted to be supported on the bottom portion of the cooking grill, and to support the top portion of the cooking grill, the insert increasing a height of the cooking chamber without substantially decreasing a horizontal cross section of the cooking chamber when positioned between the top and bottom portions of the grill, the insert defining an open window between and spaced from the top and bottom edges, and positioned to provide access to a portion of the cooking chamber, the accessory not being provided with a cover or door for covering the window; and
    a support for supporting a cooking surface on the insert in a position below the window.

13. The accessory of claim 12 further comprising a thermometer disposed on the insert.

14. The accessory of claim 12, wherein the window has a height of about 3 to about 6 inches, and a width in the horizontal dimension of about 30% to 40% of a circumference of the insert as measured along a curved surface of the sidewall.

15. The accessory of claim 12, further comprising the cooking surface positioned inside the insert, on the first plurality of supports.

16. The accessory of claim 12, wherein the first plurality of supports comprises a first plurality of bolts extending through holes in the insert from without the insert to within the insert.

17. The accessory of claim 16, further comprising handles disposed on an outside of the insert, wherein at least a few of the first plurality of bolts further comprise mounts for the handles.

18. The accessory of claim 16, further comprising a second plurality of supports for supporting the top portion of the grill on top of the insert, wherein the second plurality of supports comprises bolts extending through holes in the insert from without the insert to within the insert.

19. The accessory of claim 12, wherein the insert is formed of a flexible sheet of metal having first and second opposing lateral edges and at least first and second holes disposed near the first lateral edge and at least third and fourth holes disposed near the second lateral edge and wherein the sheet of metal is flexed into a condition such that the first and third holes overlap each other and the second and fourth holes overlap each other and wherein the piece of sheet metal is maintained in the flexed condition by a first pin passing through the first and third holes and a second pin passing through the second and fourth holes.

20. The accessory of claim 19, wherein the at least first and second holes comprise a plurality of pairs of holes, each pair of holes being laterally aligned on the sheet of metal, whereby the sheet of metal can be flexed into a cylinder of any of a plurality of different diameters by causing the third and fourth holes to overlap with different ones of the pairs of holes and inserting the first and second pins through the aligned holes, each of the plurality of different diameters corresponding to a respective one of a plurality of different grill sizes.

21. A combination comprising the accessory of claim 12, a pizza stone, and a peel.

* * * * *